United States Patent
Mihalic et al.

(10) Patent No.: US 9,845,709 B2
(45) Date of Patent: Dec. 19, 2017

(54) EXHAUST GAS LINER FOR A GAS TURBINE AND GAS TURBINE WITH SUCH AN EXHAUST GAS LINER

(71) Applicant: ALSTOM Technology Ltd, Baden (CH)

(72) Inventors: Igor Mihalic, Karlovac (HR); Mirjana Mihelic, Karlovac (HR); Mladen Matan, Karlovac (HR); Pedja Milankovic, Karlovac (HR); Juergen Pacholleck, Taegerig (CH); Christian Joerg Kreutle, Baden-Daettwil (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 191 days.

(21) Appl. No.: 14/741,941

(22) Filed: Jun. 17, 2015

(65) Prior Publication Data

US 2016/0273390 A1   Sep. 22, 2016

(30) Foreign Application Priority Data

Jun. 18, 2014 (EP) .................................. 14173014

(51) Int. Cl.
| | |
|---|---|
| *F01D 25/28* | (2006.01) |
| *F01D 25/30* | (2006.01) |
| *F01D 25/24* | (2006.01) |
| *F01D 9/04* | (2006.01) |
| *F02K 1/82* | (2006.01) |

(Continued)

(52) U.S. Cl.
CPC .............. *F01D 25/30* (2013.01); *F01D 9/042* (2013.01); *F01D 25/145* (2013.01); *F01D 25/24* (2013.01); *F01D 25/243* (2013.01); *F01D 25/246* (2013.01); *F02C 7/20* (2013.01); *F02K 1/822* (2013.01); *Y02T 50/675* (2013.01)

(58) Field of Classification Search
CPC ........ F01D 25/30; F01D 25/24; F01D 25/243; F01D 25/246; F01D 25/26; F02C 7/20; F05D 2240/91; F05D 2260/30; F02K 1/80

See application file for complete search history.

(56) References Cited

U.S. PATENT DOCUMENTS

| | | |
|---|---|---|
| 2,460,351 A | 2/1949 | Hoffman et al. |
| 4,422,300 A | 12/1983 | Dierberger et al. |

(Continued)

FOREIGN PATENT DOCUMENTS

| | | |
|---|---|---|
| EP | 2 565 400 A2 | 3/2013 |
| EP | 2 679 780 A1 | 1/2014 |

*Primary Examiner* — Lorne Meade
*Assistant Examiner* — Edwin Kang
(74) *Attorney, Agent, or Firm* — Buchanan Ingersoll & Rooney PC

(57) ABSTRACT

An exhaust gas liner for a gas turbine includes an annular inner shell and an annular outer shell, which are arranged concentrically around a machine axis of the gas turbine to define an annular exhaust gas channel in between. The inner shell and/or said outer shell are composed of a plurality of liner segments, which are attached to a support structure. To compensate thermal expansion and achieving resistance against dynamic loads, the liner segments are fixed to the support structure at certain fixation spots, which are distributed over the area of said liner segments, such that said liner segments are clamped to said support structure through a whole engine thermal cycle without hindering thermal expansion.

11 Claims, 7 Drawing Sheets

(51) Int. Cl.
    *F02C 7/20*      (2006.01)
    *F01D 25/14*     (2006.01)

(56)        References Cited

U.S. PATENT DOCUMENTS 5,775,589 A        7/1998   Vdoviak et al.
    6,045,310 A        4/2000   Miller et al.
 2008/0178465 A1       7/2008   Schiavo et al.
 2013/0318979 A1      12/2013   Kramer et al.
 2014/0219707 A1*      8/2014   Hayton .................. F01D 25/28
                                                            403/30
 2014/0227093 A1*      8/2014   Barry ..................... F01D 25/28
                                                            415/213.1
 2014/0286763 A1*      9/2014   Munshi ................... F02C 7/12
                                                            415/178
 2015/0071704 A1*      3/2015   Senofonte ................ F02K 1/80
                                                            403/299

* cited by examiner

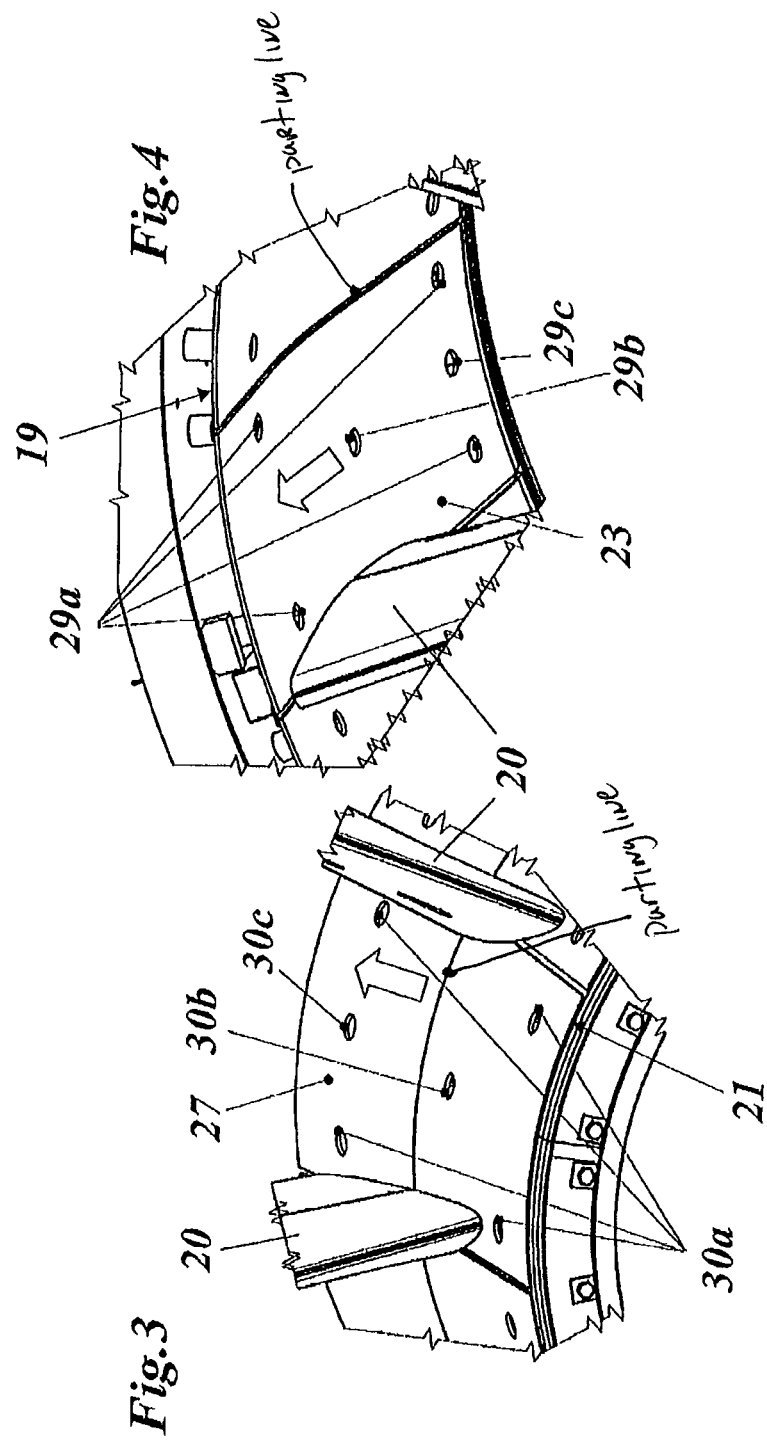

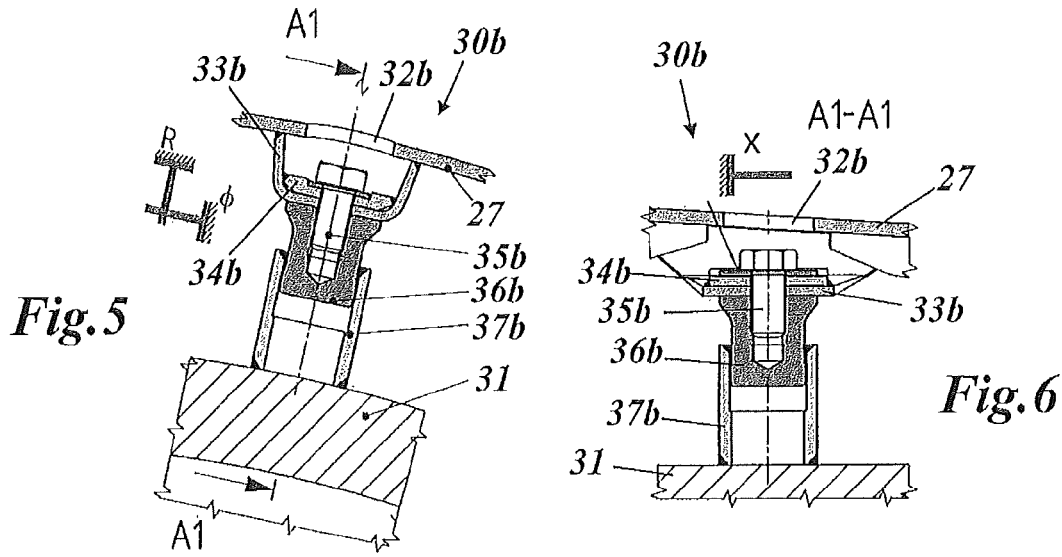
Fig. 5
Fig. 6
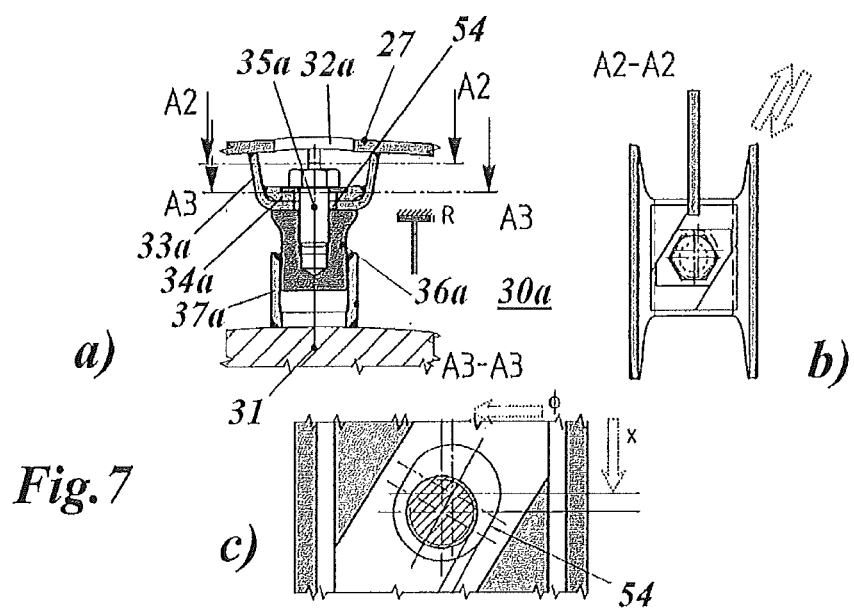
Fig. 7

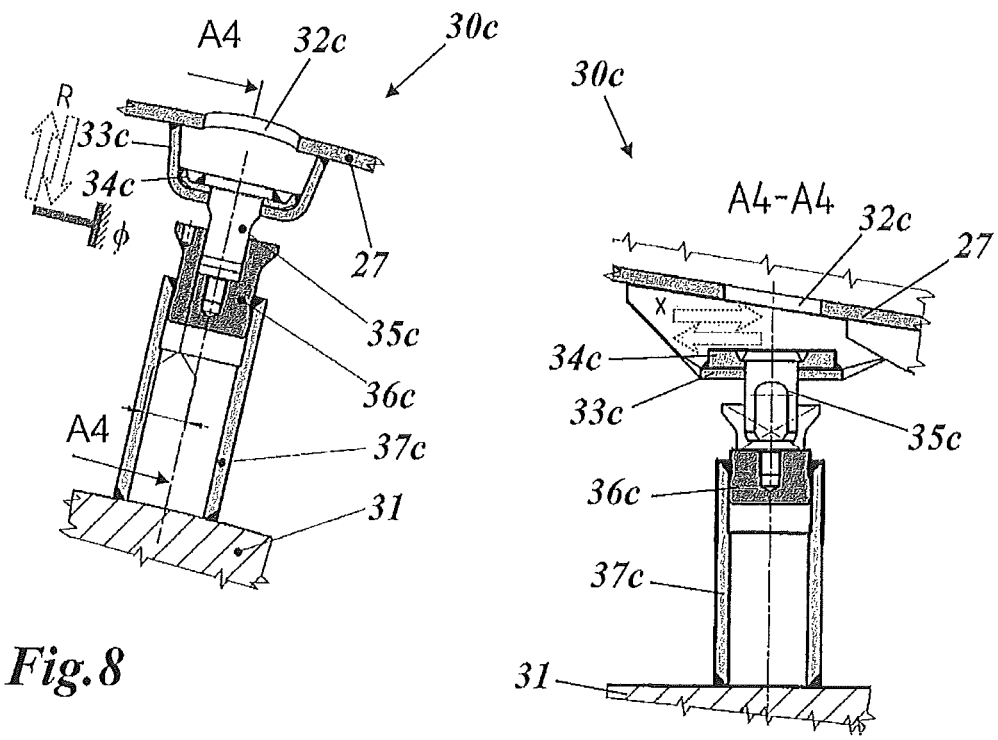
Fig.8
Fig.9
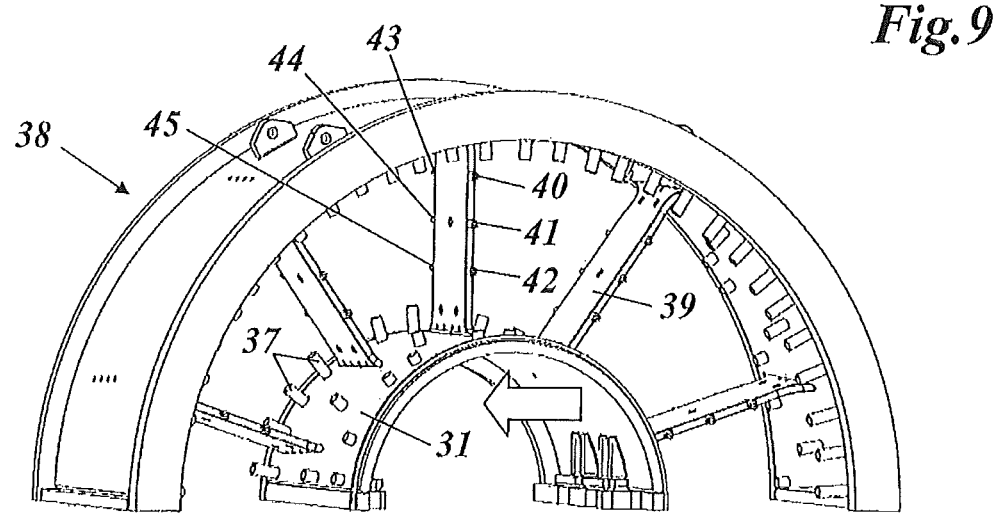
Fig.10

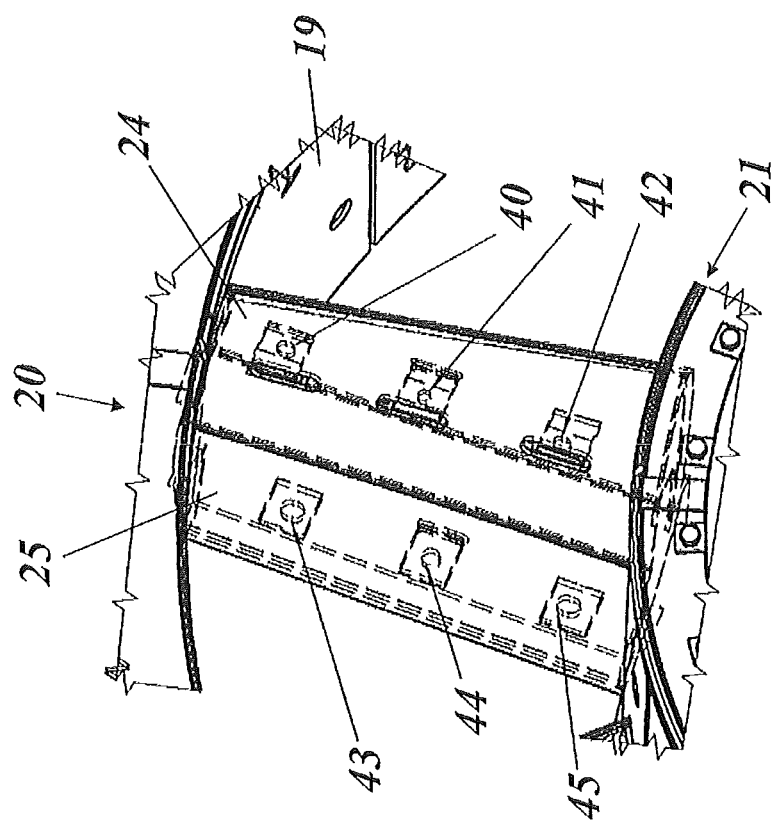

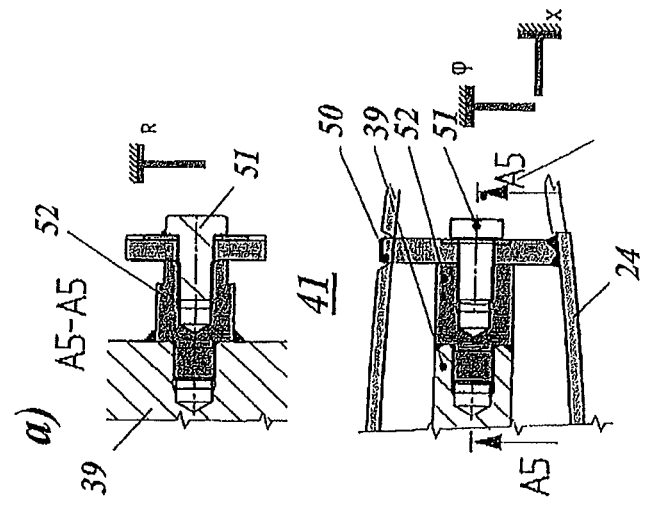
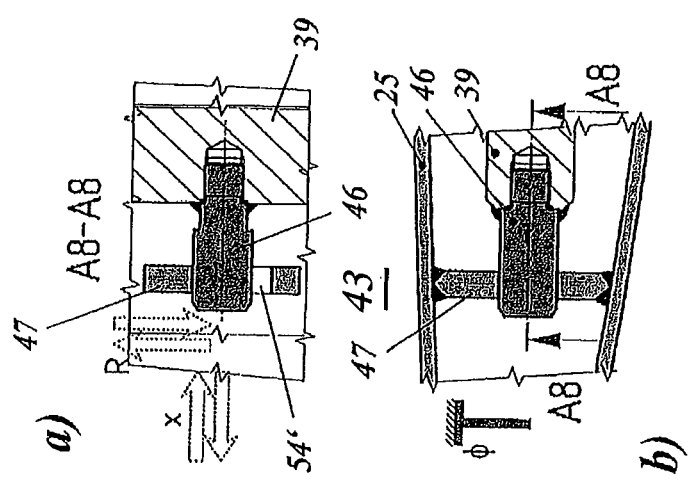

EXHAUST GAS LINER FOR A GAS TURBINE AND GAS TURBINE WITH SUCH AN EXHAUST GAS LINER

CROSS-REFERENCE TO RELATED APPLICATIONS

This application claims priority to European application 14173014.3 filed Jun. 18, 2014, the contents of which are hereby incorporated in its entirety.

TECHNICAL FIELD

The present invention relates to the technology of gas turbines. It refers to an exhaust gas liner for a gas turbine according to the preamble of claim 1.

It further refers to a gas turbine with such an exhaust gas liner.

BACKGROUND

Document EP 2 565 400 A2 discloses a gas duct for a gas turbine, which gas duct is formed by a concentric inner casing and an outer casing which concentrically encompasses the inner casing at a distance, and through which the exhaust gases from the gas turbine discharge to the outside. The inner casing and the outer casing are interconnected by means of a multiplicity of radial support struts. The support struts, the outer casing and the inner casing are equipped in each case with a heat-resistant lining for protection against the hot exhaust gases. Easy accessibility and an extensive reduction of thermal stresses is achieved by the linings of the support struts of the outer casing and of the inner casing being divided in each case into a plurality of separate segments which are fastened on a support structure in such a way that an individual thermal expansion of the individual segments is possible.

However, for the fixation of the segments, carrier beams are used. These carrier beams and a specific "star" form of inner/outer flanges are exposed to high temperatures and stresses in steady state, and therefore certain criteria of Low Cycle Fatigue (LCF) and creep of the support structure are failed.

Furthermore, connection bolts are exposed to the main gas flow. A high temperature of the bolts and connected parts and temperature gradients in both transient and steady state could lead to creep of bolt material and consequently to the loss of bolt's pretension.

SUMMARY

It is an object of the present invention to provide a new exhaust gas liner design, which avoids the drawbacks of the known design, and which compensates thermal expansion and is resistant against dynamic loads.

It is a further object of the present invention to provide a gas turbine with such an exhaust gas liner.

These and other objects are obtained by an exhaust gas liner according to claim 1 and a gas turbine according to claim 15.

The exhaust gas liner for a gas turbine according to the invention comprises an annular inner shell and an annular outer shell, which are arranged concentrically around a machine axis of said gas turbine to define an annular exhaust gas channel in between, whereby said inner shell and/or said outer shell are composed of a plurality of liner segments, which are attached to a support structure.

It is characterized in that said liner segments are fixed to said support structure at certain fixation spots, which are distributed over the area of said liner segments, such that said liner segments are clamped to said support structure through a whole engine thermal cycle without hindering thermal expansion.

According to an embodiment of the inventive exhaust gas liner all liner segments comprise a central fixation spot, where said liner segments are fixed on said support structure such that a movement of said liner segments in axial, radial and tangential direction is prevented.

Specifically, said liner segments are fixed at said central fixation spot by means of a fixation bolt, which is screwed through a holder at the backside of said liner segments into a fixation pin being fixed on said support structure.

More specifically, said fixation pin is fixed on said support structure by means of a fixation pipe, which is fixed at one end on said support structure and receives at the other end said fixation pin.

According to another embodiment of the invention all liner segments comprise an axially guiding fixation spot located on an axial centreline of said segments, where said liner segments are fixed on said support structure such that a movement of said liner segments in tangential direction is prevented.

Specifically, said liner segments are fixed at said axially guiding fixation spot by means of an axial guide pin, which is fixed to a holder at the backside of said liner segments and engages in a sliding fashion a fixation pin being fixed on said support structure.

More specifically, said fixation pin is fixed on said support structure by means of a fixation pipe, which is fixed at one end on said support structure and receives at the other end said fixation pin.

According to a further embodiment of the invention said exhaust gas liner can be separated into two parts at a parting line, and all of said liner segments except those split line segments of said inner shell abutting said parting line, comprise four side fixation spots located at four edges of said segments, where said liner segments are fixed on said support structure such that a movement of said liner segments in radial direction is prevented but a thermal expansion composed of axial and tangential components is allowed.

Specifically, said liner segments are fixed at said side fixation spots by means of a fixation bolt, which is screwed through a holder at the backside of said liner segments into a fixation pin being fixed on said support structure, whereby said holder comprises an elongated hole with location specific orientation and length.

More specifically, said fixation pin is fixed on said support structure by means of a fixation pipe, which is fixed at one end on said support structure and receives at the other end said fixation pin.

According to just another embodiment of the invention said inner shell and outer shell are connected by means of a plurality of radial struts, and each of said struts comprises a radial rib, which is covered by front and rear strut segments having a leading edge and trailing edge, which front and rear strut segments are each fixed on said radial rib at a plurality of fixation spots distributed along said leading and trailing edge.

Specifically, each of said front and rear strut segments has three fixation spots comprising a middle fixation spot, a hub side fixation spot and a tip side fixation spot.

More specifically, at the middle fixation spot of the front strut segment a fixation bolt is used to fix said front strut segment in radial, axial and tangential direction, while at the hub and tip side fixation spots a thermal expansion in radial direction is allowed.

More specifically, at the middle fixation spot of the rear strut segment an axial guiding pin is used to fix said rear strut segment thereby allowing a thermal expansion in axial direction only, while at the hub and tip side fixation spots a thermal expansion in radial and axial direction is allowed.

The gas turbine according to the invention comprises a compressor, at least one combustor and one turbine, and an exhaust gas liner, through which hot exhaust gas exits said gas turbine.

It is characterized in that the exhaust gas liner is an exhaust gas liner according to the invention.

BRIEF DESCRIPTION OF THE DRAWINGS

The present invention is now to be explained more closely by means of different embodiments and with reference to the attached drawings.

FIG. 3 shows the (in this example six) fixation spots of an inner liner segment of the exhaust gas liner according to FIG. 2;

FIG. 4 shows the (in this example six) fixation spots of an outer liner segment of the exhaust gas liner according to FIG. 2;

FIGS. 5 and 6 show the configuration of a central fixation means of the inner segment liner of FIG. 3, which fixes the segment in radial, axial and tangential (or circumferential) direction;

FIG. 7 shows the configuration of the four edge-located fixation means of the inner segment liner of FIG. 3, which fix the segment in radial direction, but allow thermal expansion in a combined axial and tangential direction;

FIGS. 8 and 9 show the configuration of an axially guiding fixation means of the inner segment liner of FIG. 3, which fixes the segment in tangential (or circumferential) direction, but allows thermal expansion in radial and axial direction;

FIG. 10 shows the upper half of the support structure used to support the liner segments of the exhaust gas liner according to FIG. 2;

FIG. 11 shows a strut of the exhaust gas liner according to FIG. 2 with its front and rear liner segments and their (in this case three) fixation spots;

FIG. 12 shows the configuration of the hub and tip fixation means of the rear liner segment of FIG. 11, which fixes the segment in circumferential direction, but allows thermal expansion in radial and axial direction;

FIG. 13 shows the configuration of the central fixation means of the front liner segment of FIG. 11, which fixes the segment in circumferential, radial and axial direction.

DETAILED DESCRIPTION

Figure 1:
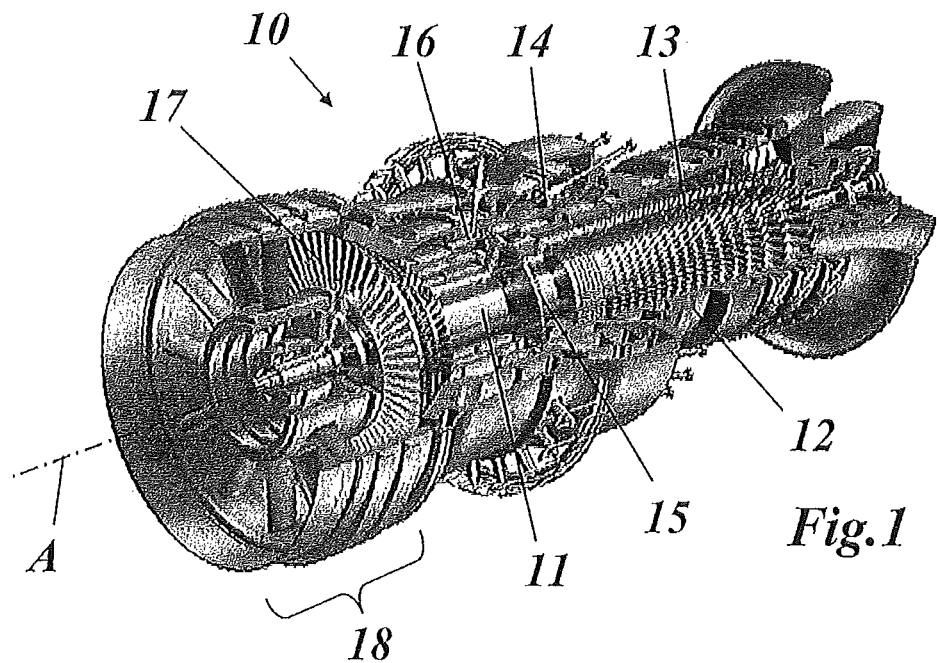
FIG. 1 shows a partial section of a gas turbine of the type GT24/26, which may use the exhaust gas liner of the present invention.

FIG. 1 shows a partial section of a gas turbine of the type GT24/26, which may use the exhaust gas liner of the present invention. Gas turbine 10 of FIG. 1 is of the reheat type comprising sequential combustion. It has a rotor 11, which is surrounded by a casing 12 and rotates around a machine axis A. A compressor 13 compresses air, which is used in a first combustor 14 to burn a fuel in order to generate hot gas. The hot gas from the first combustor 14, which still contains oxygen, drives a high pressure (HP) turbine 15, and is then used to burn a fuel in a second combustor 16. The reheated hot gas of the second combustor 16 then drives a low pressure (LP) turbine 17 and finally exits gas turbine 10 through an exhaust gas liner 18.

Exhaust gas liner 18 comprises (FIG. 2) in a concentric configuration around the machine axis A an inner shell 21 and an outer shell 19, which are connected by a plurality of radial struts 20 and are equally distributed over the circumference.

The present invention now deals with the principle of attaching the various gas liner annulus segments (22, 23 and 26, 27 and 28 in FIG. 2) and flow straightening struts (24, 25 in FIG. 2) to the casing and its support structure (see FIG. 10). The design of the fixation means of the various segments shall compensate thermal expansion and be resistant against dynamic loads.

In general, the various segments of the inner and outer shell 19, 21 and the struts 20 are fixed to the support structure by controlled cold bolt pretension. According to the present invention the parts are clamped through the whole engine thermal cycle, but still are allowed to undergo unhindered thermal growth.

Figure 2:
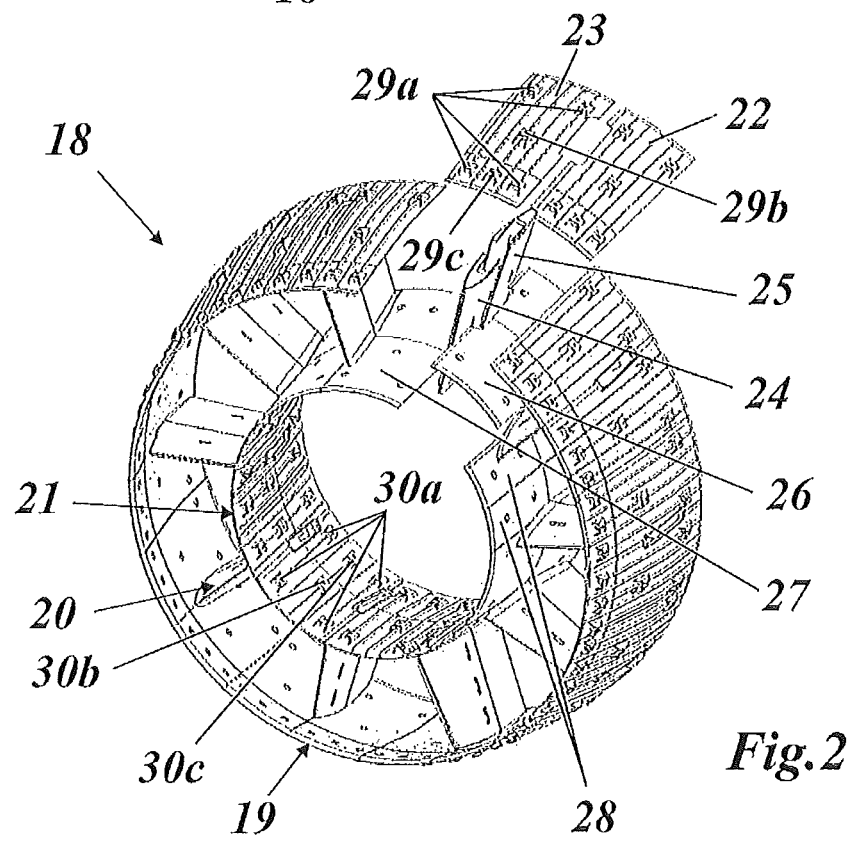
FIG. 2 shows in a perspective view the various liner segments (with their fixation spots) of an exhaust gas liner according to an embodiment of the invention.

As shown in the embodiment of FIG. 2, there are ten struts 20. One strut is positioned on the 6 o'clock position. Each strut 20 has left and right outer liner segments 22, 23, left and right inner liner segments 26, 27, and front and rear strut segments 24, 25.

Each liner segment (inner and outer) has all together six fixation spots/connections 29a-c and 30a-c (see FIGS. 3 and 4) to support structure, with exception of split line segments 28 on the inner shell 21, which are rather narrow and contain no space for a full fixation set, but use three fixation spots instead.

The liner segments 23, 27 with their six fixation spots/connections 29a-c and 30a-c are connected to the support structure (31 in FIG. 10) with the following segments fixation principle and thermal expansion capability:

1. A central fixation (fix point) 29b or 30b (see FIGS. 5 and 6) prevents movement in all three directions (x: axial, R: radial and ϕ: tangential; see the respective symbols in FIGS. 5 and 6).
2. Side fixations 29a, 30a (see FIGS. 3, 4 and 7) prevent movement in radial direction, but allow thermal expansion of the segments 23, 27 composed of axial and tangential components (x and ϕ; FIG. 7(c)). As temperature differences on a single segment (axial average vs. tangential average over time) are not so significant, the thermal movements in both directions are considered simultaneous and linearly dependant on average segment temperature. Freedom to move is achieved by elongated hole (54 in FIG. 7(c)) on a segment holder 33a, with location specific orientation and length. Bolt connection (fixation bolt 35a) with controlled pretension assures contact between the segment and fixation during the whole thermal cycle, producing the friction force opposing thermal growth/dilatation.
3. Axial guide key (30c in FIGS. 3, 8 and 9) prevents movement in tangential direction (ϕ). The guide with axial guide pin 35c located on a centreline of the segment is needed to keep the segments in symmetric position during the thermal cycle, which is important for keeping control over variation of intersegment gap sizes during the cycle.

At the central fixation spot 29b, 30b (1) a holder 33b is welded on the backside of the segment 27 just below an opening 32b (FIG. 5, 6). A support plate 34b reinforces the base of holder 33b. A fixation bolt 35b is screwed through a bore in holder 33b and support plate 34b into a fixation pin 36b. Fixation pin 36b is received by and welded to a fixation pipe 37b, which is fixed on the support structure 31. The height of the fixation pin 36b can be adjusted by sliding it relative to fixation pipe 37b before welding. FIG. 6 shows the section along line A1-A1 in FIG. 5.

At the side fixation spots 29a, 30a (2) a holder 33a is welded on the backside of the segment 27 just below an opening 32a (FIG. 7). A support plate 34a reinforces the base of holder 33a. A fixation bolt 35a is screwed through an elongated hole 54 bore in holder 33a and support plate 34a into a fixation pin 36a. Fixation pin 36a is received by and welded to a fixation pipe 37a, which is fixed on the support structure 31. The height of the fixation pin 36a can be adjusted by sliding it relative to fixation pipe 37a before welding. FIG. 7(b) and FIG. 7(c) show the sections along line A2-A2 and A3-A3 in FIG. 7(a).

At the axial guiding fixation spot 29c, 30c (3) a holder 33c is welded on the backside of the segment 27 just below an opening 32c (FIGS. 8 and 9). A support plate 34c reinforces the base of holder 33c. An axial guide pin 35c engages in a sliding fashion a fixation pin 36c. Fixation pin 36c is received by and welded to a fixation pipe 37c, which is fixed on the support structure 31. The height of the fixation pin 36c can be adjusted by sliding it relative to fixation pipe 37c before welding. FIG. 9 shows a section along line A4-A4 in FIG. 8.

Struts 20 are covered by front (leading edge LE) and rear (trailing edge TE) strut segments 24, 25 which are finally (after assembly into support structure) welded in the middle of strut. Segments 24 and 25 each have three fixation spots 40-42 and 43-45 (FIG. 11). Strut cover fixation spots are all lying in one plane.

Figure 14:
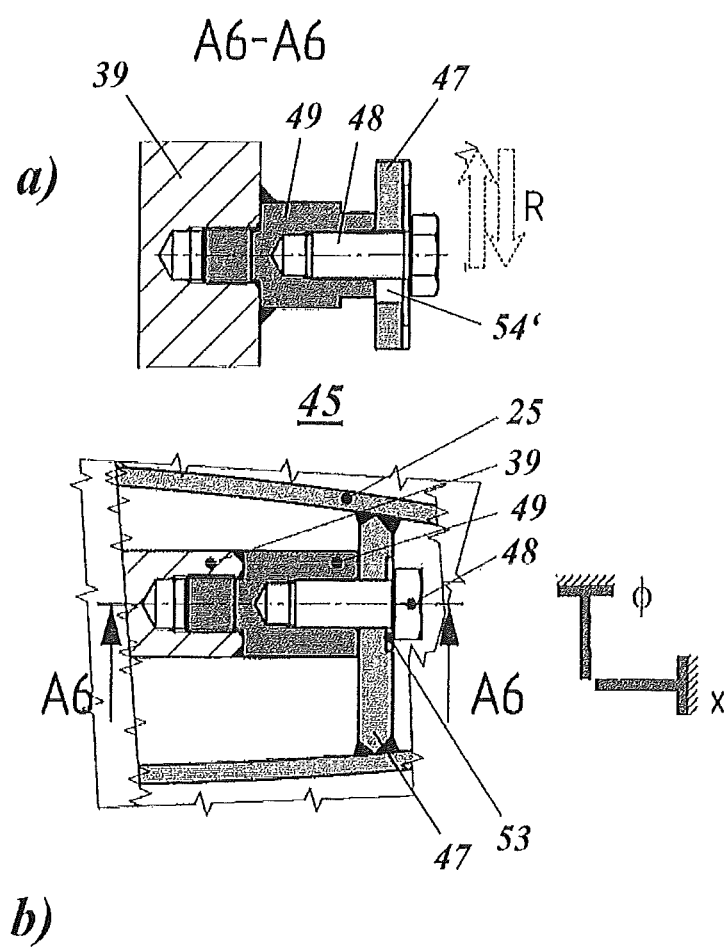
FIG. 14 shows the configuration of the hub and tip fixation means of the front liner segment of FIG. 11, which fixes the segment in circumferential and axial direction, but allows thermal expansion in radial direction.

The fixation principle with regard to thermal expansion is as follows:
1. Fix point is placed on LE side (strut segment 24), in the middle of the gas channel, forcing the strut cover to equally expand in radial direction towards the hub and the tip. A fixation bolt 51 (FIG. 13) is placed on LE (segment 24) middle of strut 20 (fixation spot 41) to prevent axial, radial and tangential movement (x, R and ϕ). FIG. 13(b) is a section along line A5-A5 in FIG. 13(a). The fixation bolt 51 is screwed through a bore in connection plate 50 of strut segment 24 into a fixation pin 52, which is screwed into and welded to a rib 39 of the support structure 31 or 38.
2. Fixations on LE hub and tip side (fixation spots 40 and 42) allow thermal expansion in radial direction (R, with friction caused by bolt pretension), but prevent movement in axial and tangential directions (x and ϕ). The configuration is shown in FIG. 14. Freedom to move is achieved by elongated hole 54' on a segment, radial oriented (FIG. 14(a)). A fixation bolt 48 is screwed through elongated hole 54' in connection plate 47 of strut segment 24 into a fixation pin 52, which is screwed into and welded to a rib 39 of the support structure 31 or 38. In all cases, a washer 53 is used for the bolt.
3. Fixation pin on TE (segment 25) middle (fixation spot 44) match radial location of a fix point on LE side (segment 24) and allows thermal movement in axial direction only.
4. Fixation pins (46 in FIG. 12) of TE (segment 25) hub and tip side (fixation spots 43 and 45) allow thermal expansion in radial and axial direction (R and x). Fixation pin 46 is screwed into a welded to rib 39. It extends through a radial elongated hole 54' in connection plate 47 of strut segment 25. FIG. 12(b) is a section of FIG. 12(a).

The invention claimed is:

1. An exhaust gas liner for a gas turbine comprising: an annular inner shell and an annular outer shell, which are arranged concentrically around a machine axis (A) of said gas turbine to define an annular exhaust gas channel in between said annular inner and outer shell, whereby said annular inner shell and/or said annular outer shell are composed of a plurality of first and second liner segments, respectively, which are attached to a support structure,
wherein each of said plurality of first and second liner segments is fixed to said support structure at a plurality of first fixation spots, which is distributed over an area of each of said plurality of first and second liner segments, respectively, such that said plurality of first and second liner segments are clamped to said support structure throughout an engine thermal cycle without hindering thermal expansion,
wherein each of said plurality of first and second liner segments is fixed on said support structure at each of said plurality of first fixation spots by means of a first fixation bolt that is attached to a first fixation pin,
wherein said first fixation pin is fixed on said support structure by means of a first fixation pipe, which is fixed at one end on said support structure and receives said first fixation pin at another end, which is open,
wherein said annular inner shell and said annular outer shell are connected by means of a plurality of radial struts, and each of said plurality of radial struts comprises a respective radial rib, wherein each of said radial rib is covered by a respective front strut segment and a respective rear strut segment, wherein each of said plurality of radial struts having a leading edge and a trailing edge, wherein each of said front strut segment is fixed on said respective radial rib at a plurality of second fixation spots distributed along said leading edge of each of said plurality of radial struts and wherein each of the rear strut segment is fixed on said respective radial rib, respectively, at a plurality of third fixation spots distributed along said trailing edge of each of said plurality of radial struts.

2. The exhaust gas liner as claimed in claim 1, wherein each of said plurality of first fixation spots of said first and second liner segments comprises a central fixation spot, where said plurality of first and second liner segments are fixed on said support structure such that a movement at the central fixation spot of each of said plurality of first and second liner segments in an axial, radial and tangential direction (x, R, θ) is prevented.

3. The exhaust gas liner as claimed in claim 2, wherein said first fixation bolt that corresponds to said central fixation spot of each of said plurality of first and second liner segments is screwed through a holder at a backside of each of said plurality of first and second liner segments into said first fixation pin being fixed on said support structure.

4. The exhaust gas liner as claimed in claim 2, wherein each of said first and second liner segments comprises an axially guiding fixation spot located on an axial centerline of each of said plurality of first and second liner segments, where said plurality of first and second liner segments are fixed on said support structure such that the movement at the axially guiding fixation spot of each of said plurality of first and second liner segments in the tangential direction (θ) is prevented.

5. The exhaust gas liner as claimed in claim 4, wherein each of said plurality of first and second liner segments is fixed at said axially guiding fixation spot by means of an axial guide pin, which is fixed to a holder at a backside of each of said plurality of first and second liner segments and engages, in a sliding fashion, a second fixation pin being fixed on said support structure.

6. The exhaust gas liner as claimed in claim 2, wherein said exhaust gas liner can be separated into two parts at a parting line, and that each of said plurality of first fixation spots of said first and second liner segments except a plurality of split line segments of said inner annular shell abutting said parting line, comprises four side fixation spots located at four edges of each of said plurality of first and second liner segments, where said plurality of first and second liner segments are fixed on said support structure such that the movement at the four side fixation spots of each of said plurality of first and second liner segments in the radial direction (R) is prevented but a thermal expansion composed of the axial and tangential components is allowed.

7. The exhaust gas liner as claimed in claim 6, wherein each of said plurality of first and second liner segments is fixed at each of said side fixation spots by means of said first fixation bolt, which is screwed through a holder at a backside of each of said plurality of first and second liner segments into said first fixation pin being fixed on said support structure, whereby said holder comprises an elongated hole with location specific orientation and length.

8. The exhaust gas liner as claimed in claim 1, wherein each of said plurality of second and third fixation spots of each of said front and rear strut segments, respectively, has three fixation spots comprising a middle fixation spot, a hub side fixation spot and a tip side fixation spot.

9. The exhaust gas liner as claimed in claim 8, wherein at the middle fixation spot of each of the front strut segments a second fixation bolt is used to fix each of said front strut segments in an axial, radial, and tangential direction (x, R, θ), while at the hub and tip side fixation spots of each of the front segments a thermal expansion in the radial direction (R) is allowed.

10. The exhaust gas liner as claimed in claim 8, wherein at the middle fixation spot of each of the rear strut segments, a second fixation bolt is used to fix each of said rear strut segment thereby allowing a thermal expansion in an axial direction only, while at the hub and tip side fixation spots of each of said rear strut segments a thermal expansion in a radial and the axial direction (R, x) is allowed.

11. A gas turbine comprising a compressor, at least one combustor and one turbine, and an exhaust gas liner according to claim 1, through which hot exhaust gas exits said gas turbine.

* * * * *